Aug. 19, 1952     G. CAMILLI ET AL     2,607,823
CREPE PAPER CABLE INSULATION
Filed Sept. 28, 1949
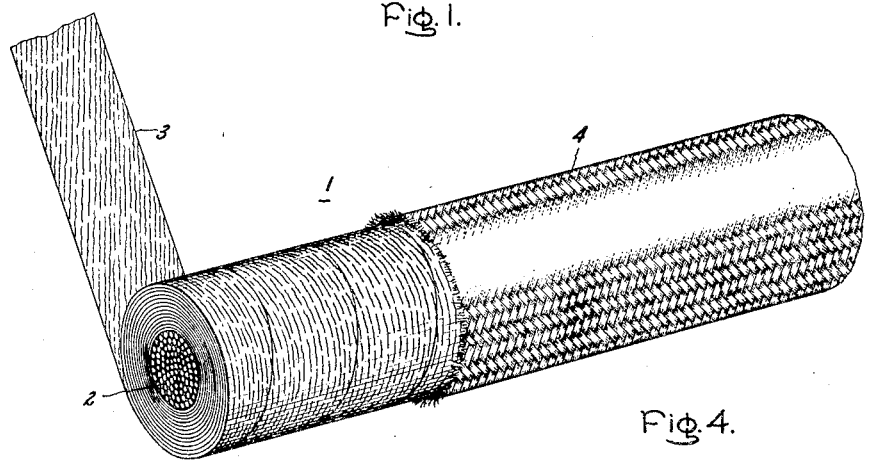
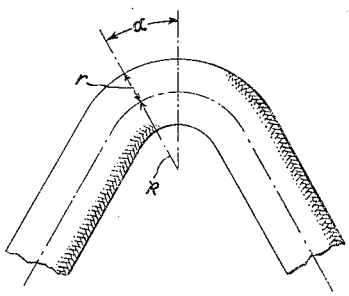
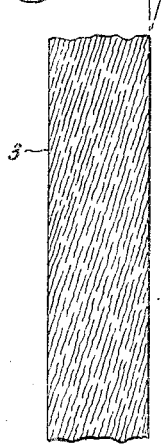
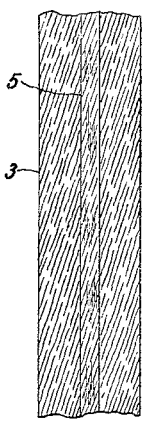
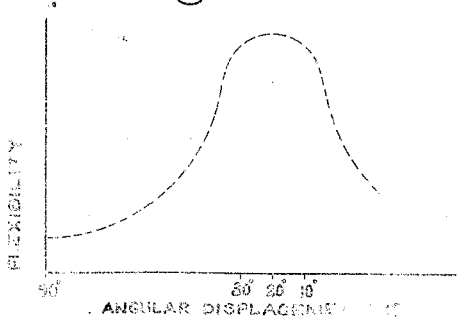
Inventors:
Guglielmo Camilli,
Leo Mulligan,
by Their Attorney.

Patented Aug. 19, 1952

2,607,823

UNITED STATES PATENT OFFICE 2,607,823

CREPE PAPER CABLE INSULATION

Guglielmo Camilli, Pittsfield, and Leo Mulligan, West Stockbridge, Mass., assignors to General Electric Company, a corporation of New York Application September 28, 1949, Serial No. 118,292

6 Claims. (Cl. 174—124)

This invention relates to electric cables, and more particularly to insulation for such cables.

In the manufacture of electric cables, it has been known in the past to use paper as an insulating winding on the cable. However, although such paper insulation has the advantage of economy, it has the disadvantage in many cases that difficulty is encountered in bending such cables without danger of rupturing the paper insulation inside. Cables constructed of manila paper insulation cannot be bent into a relatively small radius, and, in general, cannot be bent to a radius smaller than one hundred times their outer diameter. This characteristic of paper-insulated cable is undesirable where the application requires bending of the cable to a small radius, such as for use in power and distribution transformers where very flexible cables are required.

It is an object of this invention to provide a paper insulation for a cable so constructed as to permit the cable to have bends of very short radius.

It is a further object of this invention to provide a type of cable insulation which will result in a very flexible cable.

In accomplishment of these objectives this invention provides a crepe paper insulation for an electrical cable in which the paper is creped in such manner that the crepe lines or corrugations encircle the cable conductor in planes which are perpendicular to the axis of the cable after the insulation is wound on the cable.

The features of this invention which we believe to be novel are set forth with particularity in the appended claims. Our invention itself, however, both as to its organization and use, together with further objects and advantages thereof, may best be understood by reference to the following description taken in connection with the accompanying drawing in which Fig. 1 represents a cable having crepe paper insulation laid thereon in accordance with our invention; Fig. 2 represents a detail view of the crepe paper of Fig. 1; Fig. 3 is a graph which shows the relation of cable flexibility to angular displacement of the crepe lines or corrugations on the tape; Fig. 4 is a view of a cable bent to a small radius; Figs. 5 (a) and 5 (b) are cross-sectional views of a crepe paper tape showing the effect of calendering the crepe paper; while Fig. 6 shows a modified but preferred form of our crepe paper tape having an axial retaining strip to prevent distortion during winding on the cable.

Referring now to the drawing, there is shown in Fig. 1 a cable 1 with a multi-strand copper conducting core 2 having wound thereon a plurality of layers of our crepe paper insulation 3. A braided fiber or cloth sheath 4 of any suitable type serves as an outer protective covering for the cable. In accordance with our invention, the crepe paper is wound onto the axis of the cable spirally in such manner that the crepe lines or corrugations on the tape encircle the cable conductor in planes which are perpendicular to the axis of the cable. This effect is achieved by having the angle which the crepe lines make with the axis of the tape the same or approximately the same as, but in an opposite direction to, the angle which the axis of the tape makes with a perpendicular to the axis of the cable. The net result is that these two angular displacements offset one another so that the crepe lines encircle the cable conductor in planes which are perpendicular to the axis of the cable. When the crepe lines encircle the cable conductor in planes which are perpendicular to the axis of the cable, in accordance with our invention, it can be seen that maximum flexibility of the cable is achieved, since the crepe paper will yield with an accordion-like effect.

It will be noted that the plurality of layers of crepe paper constitute the only insulation wrapping surrounding the conductor 2, except for the outer protective cover or sheath 4. The radial thickness of the cover or sheath 4 is very small compared to the combined thickness of the layers of crepe paper.

In Fig. 2, in which there is shown a detail view of the manner in which the paper is creped, it will be noted that the crepe lines on the tape are at an angle of 15 to 20 degrees with respect to the axis of the tape. It will be seen, therefore, that when paper which is creped as shown in Fig. 2 is spirally laid onto the cable with its axis at an angle of 15 to 20 degrees with respect to a perpendicular to the axis of the cable, the resultant angle which the planes of the encircling crepe lines on the tape will make with the axis of the cable will be 90 degrees, provided the respective 15 to 20 degree angles are in opposite directions.

We have found by experimentation that the optimum angle which the crepe lines should make with the axis of the tape, and the corresponding spiral angle at which the tape should be wound with respect to a perpendicular drawn to the axis of the cable, is in the range of 15 to 20 degrees. The results of our experimentation are graphically illustrated in Fig. 3 in which cable flexibility is plotted as an ordinate against angular displacement of crepe lines from the axis of the tape as an abscissa. It can be seen that maximum cable flexibility is obtained at a crepe angle of approximately 15 to 20 degrees. This graphical representation is based upon test results which were obtained with a cable consisting of 450 wires of size No. 24 (450/24) with an insulating wall thickness of ⅜ inch and in which the width of the tape is equal to ¾ inch. However, it can be stated that the optimum angle will lie in the range of 15 to 20 degrees for practically any cable in ordinary commercial use.

In Fig. 4, there is shown a plan view of a length of cable which is bent into a curve, in order to illustrate the relation between the permissible elongation of the cable and its radius of curvature. Referring to Fig. 4, assume that the illustrated cable has a radius $r$ and is bent to a radius $R$. If a length of cable corresponding to an angle $a$ is considered, with $a$ being measured in radians, the length measured along the axis of the cable will be $=Ra$, and the length of the outside surface will be $=(R+r)a$. Hence, it can be seen that the elongation which the paper has to withstand on a length $Ra$ is $ra$. The percentage of elongation will be $$\frac{r}{R}100$$

Ordinary papers will withstand an elongation of 2 percent before breakdown. If a value of ½ percent is considered safe, the conclusion is reached that an ordinary cable should not be bent to a radius smaller than that given by the equation:

$$\frac{r}{R}100 = 0.5$$

$$R = 200r$$

This analysis shows that the minimum allowable radius of curvature of the cable is very large. However, the value given by the equation is modified by the fact that it is based on the assumption that the paper is laid on the cable in a continuous tube. While this assumption is valid for very tight insulation, it is not as valid where, as in most ordinary cables, the paper is laid helically on the conductors in the form of tapes. If these tapes are narrow and the friction between the layers is slight, the tapes can slip over one another and the paper is not subjected to as much stress. While the use of tapes rather than a solid insulating tube reduces the permissible radius of curvature in terms of cable radius to a value smaller than that given in the preceding equation, nevertheless a relatively large radius of curvature is still necessary when ordinary paper insulation is used. However, when crepe paper insulation is used in accordance with our invention, a very much smaller radius of curvature is permissible.

We also have found that the dielectric properties of our crepe paper insulation can be improved by using crepe paper which has been calendered before winding on the cable. That is, the crepe paper should be passed between two metal rolls which are maintained closer together than the thickness of the crepe paper. This causes the corrugations of the crepe paper to be mashed down, thereby reducing the thickness of the paper, although its creped characteristic is still preserved. This is illustrated by Figs. 5 (a) and 5 (b), which represent cross-sectional views of one layer of crepe paper before and after calendering, respectively. When a plurality of layers of the crepe paper insulation are wound about the central conductor, a greater number of layers can be wound for a given cable diameter when the paper which is used has been calendered as just described. Thus, the space factor of the insulation is improved by calendering the crepe paper.

When crepe paper tape having corrugations angularly positioned in accordance with our invention is spirally laid on the cable, the difficulty is sometimes encountered that the tension on the tape will cause the crepe corrugations to yield, thereby increasing the width and length of the paper. This is particularly undesirable where it is desired to have succeeding turns of the paper butted against one another. We have discovered that the occurrence of this increase in width upon winding may be prevented if a thin retaining strip of some relatively non-yielding material, preferably a cellulose composition, is adhesively attached to the center of the calendered crepe paper strip, running for the entire length of the strip, as illustrated at 5 in Fig. 6. We have found that a very desirable material for this purpose is a narrow strip of cellulose acetate which may be attached to the crepe paper by means of a solution of acetone. The addition of this strip of non-yielding material, such as cellulose acetate, for example, prevents the axial tension exerted during the winding operation from causing the crepe corrugations to yield so as to increase the width and length of the tape. However, once the crepe paper tape has been laid on the cable, a bending force transverse to the axis of the tape will cause a yielding of the corrugations, thereby giving the cable the quality of flexibility.

An alternative method of preventing distortion of the crepe paper tape during the winding process is to use crepe paper which has been coated with a suitable resin, thereby "fixing" the crepe lines and causing them to resist stretching during winding. However, the crepe paper so treated will still retain its flexibility sufficiently to yield satisfactorily when the cable is bent.

While there have been shown and described particular embodiments of our invention, it will be obvious to those skilled in the art that various changes and modifications can be made therein without departing from the invention, and, therefore, it is aimed in the appended claims to cover all such changes and modifications as fall within the true spirit and scope of the invention.

What we claim as new and desire to secure by Letters Patent of the United States is:

1. A flexible electrical cable comprising an electrical conductor, a plurality of layers of crepe paper tape, said tape being spirally wound on said conductor, the crepe lines on said tape being at an angle in the range of 15 to 20 degrees with respect to the axis of said tape, the axis of said wound tape being at a spiral angle in the range of 15 to 20 degrees from a perpendicular drawn to the axis of said conductor, and in an opposite direction to the angle which the crepe lines on said tape make with the axis of said tape, so that said crepe lines encircle said conductor in planes which are substantially perpendicular to the axis of said conductor when said tape is wound on said conductor, and a protective sheath-like covering surrounding the outermost layer of said crepe paper, the radial thickness of said covering being very small in comparison to the radial thickness of said layers of crepe paper, said crepe paper and said external covering being substantially the only insulation wrappings surrounding said conductor.

2. A flexible electrical cable comprising an electrical conductor, a plurality of layers of crepe paper tape spirally wound about said conductor, the crepe lines on said tape being biased angularly of the axis of said tape, said tape being wound on said conductor with its axis at a spiral angle with respect to a perpendicular drawn to the axis of the conductor which is substantially equal in magnitude and opposite in direction to the angle which said crepe lines make with the axis of said tape, so that said crepe lines encircle said conductor in planes which are substantially perpendicular to the axis of said conductor, and a protective sheath-like covering surrounding the outermost layer of said crepe paper, the radial thickness of said covering being very small in comparison to the radial thickness of said layers of crepe paper, said crepe paper and said external covering being substantially the only insulation wrappings surrounding said conductor.

3. A flexible electrical cable comprising an electrical conductor, a plurality of layers of calendered crepe paper tape, said tape being spirally wound on said conductor, the crepe lines on said tape being at an angle in the range of 15 to 20 degrees with respect to the axis of said tape, the axis of said wound tape being at a spiral angle in the range of 15 to 20 degrees from a perpendicular drawn to the axis of said conductor, and in an opposite direction to the angle which the crepe lines on said tape make with the axis of said tape, so that said crepe lines encircle said conductor in planes which are substantially perpendicular to the axis of said conductor when said tape is wound on said conductor, and a protective sheath-like covering surrounding the outermost layer of said crepe paper, the radial thickness of said covering being very small in comparison to the combined radial thickness of said layers of crepe paper, said crepe paper and said external covering being substantially the only insulation wrappings surrounding said conductor.

4. A flexible electrical cable comprising an electrical conductor, a plurality of layers of calendered crepe paper tape being wound in a spiral about said conductor, the crepe lines on said tape being angularly positioned with respect to the axis of said tape, said spiral having an angle with respect to a perpendicular to the axis of said conductor which is substantially the same as the angle of said crepe lines with respect to the axis of said tape, but in an opposite direction, so that the crepe lines on said paper tape encircle said conductor in planes which are substantially perpendicular to the axis of said cable after said paper tape is wound about said conductor, and a protective sheath-like covering surrounding the outermost layer of said crepe paper, the radial thickness of said covering being very small in comparison to the combined radial thickness of said layers of crepe paper, said crepe paper and said external covering being substantially the only insulation wrappings surrounding said conductor.

5. A flexible electrical cable comprising an electrical conductor, a plurality of layers of crepe paper tape spirally wound about said conductor, the crepe lines on said tape being biased angularly of the axis of said tape, said tape being spirally wound on said conductor with its axis at a spiral angle with respect to a perpendicular drawn to the axis of the conductor which is substantially equal in magnitude and opposite in direction to the angle which said crepe lines make with the axis of said tape, so that said crepe lines encircle said conductor in planes which are substantially perpendicular to the axis of said conductor, said crepe paper tape having adhesively attached along the entire length of its longitudinal axis a narrow strip of uncreped tape to prevent distortion of said crepe paper tape during winding, and a protective sheath-like covering surrounding the outermost layer of said crepe paper, the radial thickness of said covering being very small in comparison to the combined radial thickness of said plurality of layers of crepe paper, said crepe paper and said external covering being substantially the only insulation wrappings surrounding said conductor.

6. A flexible electrical cable comprising an electrical conductor, a plurality of layers of crepe paper tape spirally wound about said conductor, the crepe lines on said tape being biased angularly of the axis of said tape, said tape being wound on said conductor with its axis at a spiral angle with respect to a perpendicular drawn to the axis of the conductor which is substantially equal in magnitude and opposite in direction to the angle which said crepe lines make with the axis of said tape, so that said crepe lines encircle said conductor in planes which are substantially perpendicular to the axis of said conductor, said crepe paper tape having adhesively attached along the entire length of its longitudinal axis a narrow strip of cellulose acetate to prevent distortion of said crepe paper tape during winding, and a protective sheath-like covering surrounding the outermost layer of said crepe paper, the radial thickness of said covering being very small in comparison to the radial thickness of said plurality of layers of crepe paper, said crepe paper and said external covering being substantially the only insulation wrappings surrounding said conductor.

GUGLIELMO CAMILLI.
LEO MULLIGAN.

REFERENCES CITED

The following references are of record in the file of this patent:

UNITED STATES PATENTS

| Number | Name | Date |
| --- | --- | --- |
| 1,905,789 | Benner et al. | Apr. 25, 1933 |
| 2,015,714 | Del Mar | Oct. 1, 1935 |
| 2,045,103 | Rosch | June 23, 1936 |
| 2,097,501 | Reicheld | Nov. 2, 1937 |
| 2,222,638 | Szilard | Nov. 26, 1940 |

FOREIGN PATENTS

| Number | Country | Date |
| --- | --- | --- |
| 19,951 | England | Sept. 7, 1901 |